(12) United States Patent
Hardy et al.

(10) Patent No.: US 10,609,448 B2
(45) Date of Patent: *Mar. 31, 2020

(54) AUTHORIZATION AND AUTHENTICATION OF A DEVICE USING A TELEVISION RECEIVER

(71) Applicant: DISH Network L.L.C., Englewood, CO (US)

(72) Inventors: Christofer Hardy, Cheyenne, WY (US); Tabitha Smallwood, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,553

(22) Filed: Jul. 20, 2018

(65) Prior Publication Data

US 2019/0045262 A1 Feb. 7, 2019

Related U.S. Application Data

(63) Continuation of application No. 15/670,808, filed on Aug. 7, 2017, now Pat. No. 10,063,916.

(51) Int. Cl.

| | |
|---|---|
| *H04H 60/33* | (2008.01) |
| *H04N 21/441* | (2011.01) |
| *G06F 3/01* | (2006.01) |
| *G06F 21/35* | (2013.01) |
| *H04N 13/332* | (2018.01) |

(Continued)

(52) U.S. Cl.
CPC ........... *H04N 21/441* (2013.01); *G06F 3/011* (2013.01); *G06F 21/10* (2013.01); *G06F 21/35* (2013.01); *H04N 13/332* (2018.05); *H04N 21/4367* (2013.01); *H04N 21/816* (2013.01)

(58) Field of Classification Search
CPC ............. H04N 21/441; H04N 21/4367; H04N 21/816; H04N 13/332; G06F 3/011; G06F 21/10; G06F 21/35
See application file for complete search history.

(56) References Cited

U.S. PATENT DOCUMENTS

| | | |
|---|---|---|
| 9,871,774 B1 | 1/2018 | Liu et al. |
| 10,063,916 B1 | 8/2018 | Hardy et al. |

(Continued)

OTHER PUBLICATIONS

U.S. Appl. No. 15/670,808, Notice of Allowance dated May 10, 2018, all pages.

*Primary Examiner* — Mulugeta Mengesha
(74) *Attorney, Agent, or Firm* — Kilpatrick Townsend & Stockton LLP

(57) ABSTRACT

Various arrangements are presented for using an electronic device for content playback. A television receiver may provide to the device access to a shared encryption key. The shared encryption key may be used to decrypt content from an over-the-top (OTT) content host system. The device may request content from the OTT content host system using the set of credentials. The device may then receive encrypted content from the OTT content host system, wherein the encrypted content corresponds to the requested content. The encrypted content received from the OTT content host system may be decrypted by the device using the shared encryption key. The device may then output for presentation the decrypted content.

20 Claims, 7 Drawing Sheets

(51) Int. Cl.
*G06F 21/10* (2013.01)
*H04N 21/4367* (2011.01)
*H04N 21/81* (2011.01)

(56) References Cited

U.S. PATENT DOCUMENTS

| | | | |
|---|---|---|---|
| 2014/0157392 A1* | 6/2014 | Smith | H04L 63/08 |
| | | | 726/9 |
| 2014/0281489 A1 | 9/2014 | Peterka et al. | |
| 2015/0163533 A1* | 6/2015 | Donnellan | H04N 21/4126 |
| | | | 725/28 |
| 2016/0105428 A1* | 4/2016 | Schrempp | H04L 63/0853 |
| | | | 726/7 |
| 2017/0105053 A1 | 4/2017 | Todd | |

\* cited by examiner

AUTHORIZATION AND AUTHENTICATION OF A DEVICE USING A TELEVISION RECEIVER

BACKGROUND

Virtual reality (VR) and augmented reality (AR) headsets are becoming more common. For example, some smartphones can be attached with or inserted into a VR or AR headset to provide a user with an immersive VR or AR experience. Alternatively, a dedicated VR or AR device or system may be used. In the future, users will want to experience more content via such VR and AR interfaces.

SUMMARY

Various embodiments are described related to a virtual reality (VR) device for content playback. In some embodiments, a method for a VR device for content playback is described. The method may include providing, by the VR device to a television receiver, via direct wireless communication, a set of credentials comprising an indication of a user account and password. The method may include authenticating, by the television receiver, the set of credentials. The method may include providing, by the television receiver to the VR device, access to a shared encryption key. The shared encryption key may be used to decrypt content from an over-the-top (OTT) content host system. The method may include requesting, by the VR device, content from the OTT content host system using the set of credentials. The method may include receiving, by the VR device, encrypted content from the OTT content host system. The encrypted content may correspond to the requested content. The method may include decrypting, by the VR device, the encrypted content received from the OTT content host system using the shared encryption key to create decrypted content. The method may include outputting, by the VR device, for presentation the decrypted content.

Embodiments of such a method may include one or more of the following features: The method may include providing, by the television receiver to the VR device, access to a shared encryption key comprises the television receiver transmitting the shared encryption key to the VR device via direct wireless communication. The method may include providing, by the television receiver to the VR device, access to a shared encryption key comprises providing, by the television receiver, the VR device with data sufficient to retrieve the shared encryption key from the OTT content host system. The method may include retrieving, by the VR device, from the OTT content host system, the shared encryption key using the data provided by the television receiver. The method may include providing, by the television receiver, the VR device with the data sufficient to retrieve the shared encryption key from the OTT content host system comprises the television receiver outputting for presentation a graphical code that is imaged by the VR device. Providing, by the television receiver, the VR device with the data sufficient to retrieve the shared encryption key from the OTT content host system may include the television receiver outputting for presentation an alphanumeric code to be input to the VR device. The method may include outputting, by the television receiver, for presentation a first portion of the content prior to outputting, by the VR device, for presentation the portion of the decrypted content. The first portion of the content may be output from a copy of the content stored locally by the television receiver. The method may include transmitting, by the television receiver, a marker to the OTT content host system. The marker may be indicative of: a user account, the content, and a location within the content at which playback stopped. The encrypted content may sequentially follow the first portion of the content. The method may include, in response to the VR device requesting the content from the OTT content host system using the set of credentials, determining, by the OTT content host system, a first portion of the content to transmit as the encrypted content based on the marker. The method may include streaming, by the OTT content host system the first portion of the content as the encrypted content to the VR device. The method may include outputting, by the television receiver, for presentation a first portion of the content prior to outputting, by the VR device, for presentation the portion of the decrypted content. The method may include storing, by the OTT content host system, a marker indicative of: a user account linked with the television receiver, the content, and a location within the content at which playback stopped. The encrypted content may sequentially follow the first portion of the content. The method may include, in response to the VR device requesting the content from the OTT content host system using the set of credentials, determining, by the OTT content host system, a first portion of the content to transmit as the encrypted content based on the marker. The method may include deleting, by the VR device, the shared encryption key in response to an expiration time of the shared encryption key being reached.

In some embodiments, a system for playing back content at a virtual reality device is described. The system may include a virtual reality (VR) device. The VR device may include a headset, a display that provides a user within a virtual reality viewing experience, and a wireless communication interface. The VR device may be configured to provide, to a television receiver, via direct wireless communication, a set of credentials comprising an indication of a user account and password. The system may further include a television receiver, comprising one or more processors and one or more tuners, may be configured to authenticate the set of credentials. The television receiver may provide, to the VR device, access to a shared encryption key. The shared encryption key may be used to decrypt content from an over-the-top (OTT) content host system. The device may be configured to request content from the OTT content host system using the set of credentials. The device may receive encrypted content from the OTT content host system. The encrypted content may correspond to the requested content. The device may decrypt the encrypted content received from the OTT content host system using the shared encryption key to create decrypted content. The device may output for presentation, via the display, the decrypted content.

Embodiments of such a system may include one or more of the following features: The television receiver may be configured to transmit the shared encryption key to the VR device via direct wireless communication. The television receiver providing access to the shared encryption key to the VR device may include the television receiver being configured to provide the VR device with data sufficient to retrieve the shared encryption key from the OTT content host system. The VR device may be configured to retrieve, from the OTT content host system, the shared encryption key using the data provided by the television receiver. The television receiver providing the VR device with the data sufficient to retrieve the shared encryption key from the OTT content host system may include the television receiver being configured to output, for presentation, a graphical code that is imaged by the VR device. The television receiver providing the VR device with the data sufficient to retrieve the shared encryption key from the OTT content host system may include the television receiver being configured to output for presentation an alphanumeric code to be input to the VR device. The television receiver may be further configured to output, for presentation, a first portion of the content prior to the VR device outputting for presentation the portion of the decrypted content. The first portion of the content may be output from a copy of the content stored locally by the television receiver. The television receiver may be further configured to transmit a marker to the OTT content host system. The marker may be indicative of: a user account, the content, and a location within the content at which playback stopped. The encrypted content may sequentially follow the first portion of the content. The system, further comprising the OTT content host system, may be configured to, in response to the VR device requesting the content from the OTT content host system using the set of credentials, determine a first portion of the content to transmit as the encrypted content based on the marker. The system may stream the first portion of the content as the encrypted content to the VR device. The system further comprising the OTT content host system and the television receiver may be configured to output, for presentation, a first portion of the content prior to the VR device outputting for presentation the portion of the decrypted content. The OTT content host system may be configured to determine a first portion of the content to transmit as the encrypted content based on a stored marker indicative of a user account linked with the television receiver, the content, and a location within the content at which playback stopped. The encrypted content may sequentially follow the first portion of the content. The VR device may be further configured to delete the shared encryption key in response to an expiration time of the shared encryption key being reached.

DETAILED DESCRIPTION

A user may subscribe to a television or content service that allows the user to receive broadcast and/or streaming content from a service provider. The user may desire to view such content using a television, tablet computer, or some other form of display device. A user may wish to view content using a virtual reality (VR) or augmented reality (AR) device, such as a VR headset. While a television receiver is typically located in a fixed location (e.g., connected via a wired connection with an antenna), a VR device may be portable. For instance, some smartphones can be inserted into a VR headset to enable VR functionality. The television service provider may desire to confirm that the VR device is being used by the same user that subscribes to the service provider and has the television receiver installed at his residence. Otherwise, it may be relatively easy for the user to circulate his credentials (e.g., username and password) to others and allow them access to his subscription with the television service provider.

To combat such a form of "account packing" (which is the situation where multiple persons located at different residences use the same subscription account), the VR device may be required to be in physical proximity to the television receiver for an initial or intermittent registration process. Only by performing such a registration process does the VR device become eligible to view content from the television service provider.

Additionally, once a user has a registered VR device, the user may desire to transition content playback from the television receiver to the VR device (or from the VR device to the television receiver). For example, a user may desire to watch the first half of a television program output to a television by the television receiver, but may decide to watch to the second half of the television program using the VR device. The user will likely desire to continue playback at the second device from where he stopped at the first device. To do so, the service provider may store a marker that indicates: a user account or user name, the content, and a location within the content. When a user continues playback of the content from another device, such as the VR device, the marker is used to determine from where playback should initiate. Such an arrangement may be used for content that is streamed from the service provider or for content that was recorded by the television receiver but is also available via streaming from the service provider. Additional detail regarding the registration process and transitioning playback between the VR device and television receiver is provided in relation to the figures.

Figure 1:
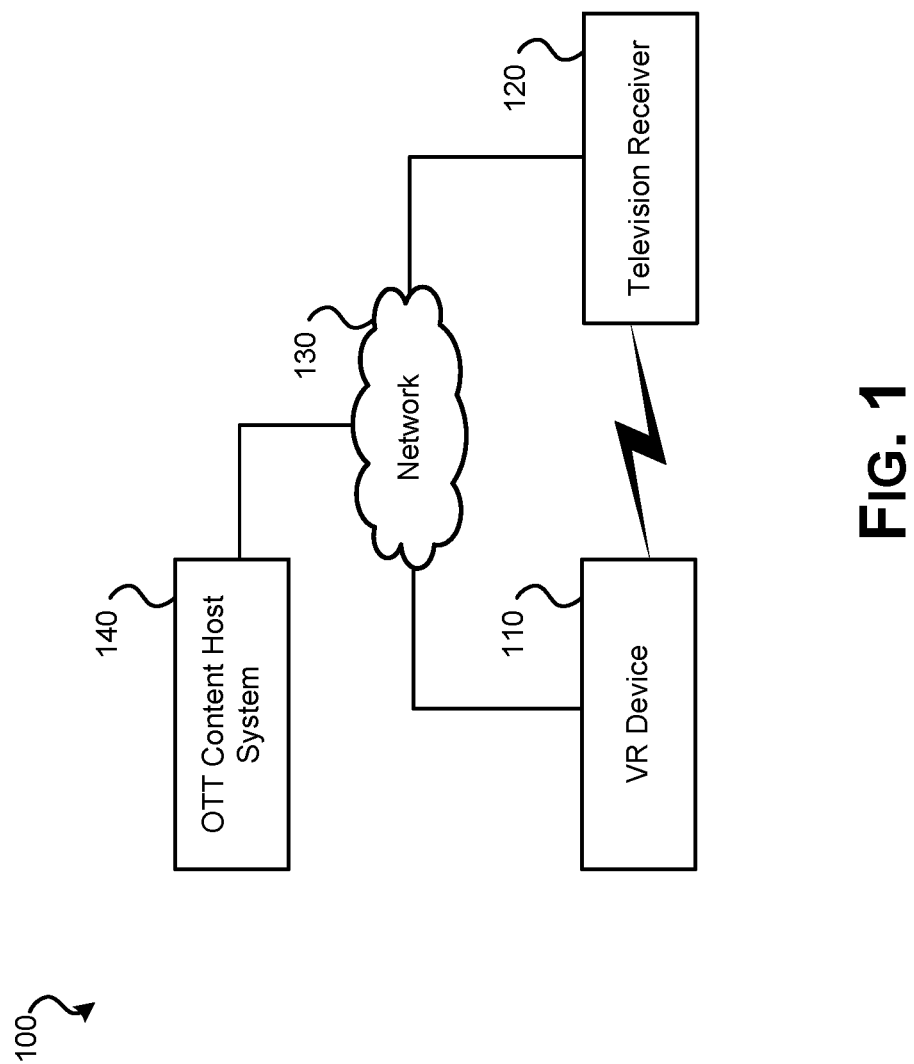
FIG. 1 illustrates an embodiment of an integrated VR content playback system.

FIG. 1 illustrates an embodiment of an integrated VR content playback system 100. Integrated VR content playback system 100 can include: VR device 110, television receiver 120, network 130, and over-the-top (OTT) content host system 140 (abbreviated "OTT host" herein). VR device 110 can refer to various forms of VR and AR devices. For example, a smartphone may be converted into a VR or AR device may installing the smartphone in a headset. VR device 110 may be a dedicated VR or AR headset or other form of device that provides a user with a virtual or augmented environment. VR device 110 may include a display that can output content in a virtual reality experience for a user. VR device 110 may include one or more accelerometers, gyroscopes, and location sensors, which may be used for determining where a user is facing (e.g., to update the displayed content). VR device 110 may include a headset to hold the device to a user's head and one or more wireless interfaces to communicate with other devices such as television receiver 120.

Television receiver 120 can represent a dedicated receiver device, such as a set top box (STB) that received content from a television service provider. Television receiver 120 may also be incorporated as part of another device, such as a television. Television receiver 120 may receive content (e.g., television programming, on-demand content) via a dedicated television provider network, such as a cable-based network or satellite-based network. Television receiver 120 may have a secure one-directional or bi-directional communication path, distinct from the Internet, with OTT host 140 (which may be operated by the television service provider).

For instance, in a satellite-based network, a television service provider can transmit encrypted data to television receiver 120 via satellite.

Television receiver 120 and VR device 110 may be able to communicate with OTT host via network 130. Network 130 may be a combination of one or more public and/or private networks, including a local area network (LAN) at a location at which television receiver 120 is installed and the Internet.

OTT host 140 may represent one or more distributed host server systems that are configured to stream or otherwise distribute content to authorized devices. OTT host 140 may be configured to distribute content to VR device 110 if VR device 110 is successfully authorized and authenticated.

Television receiver 120 may be configured to directly communicate with VR device 110 via a direct wireless protocol, such as Bluetooth® or WiFi Direct®. In other embodiments, direct communication between television receiver 120 and VR device 110 may be realized by a graphical or alphanumeric code being output by television receiver 120 for presentation, which may be imaged by or input via user input to VR device 110. The communication path between VR device 110 and television receiver 120 may be used for authentication purposes. This registration process may be used to help ensure that VR device 110 is operated by the user that has an authorized subscription through television receiver 120. In some embodiments, a shared symmetrical key may be used for decrypting content received from OTT host 140 (and, possibly, encrypting messages to be transmitted to OTT host 140). This shared symmetrical key may be received by television receiver 120 via a secure path or may be generated by television receiver 120. In some embodiments, OTT host 140 may generate the shared key and the shared key may be transmitted to television receiver 120 via a dedicated television service provider network (e.g., as detailed in relation to FIG. 6) in an encrypted form. The television receiver may have on-board circuitry (such as in the form of a smartcard, as detailed in relation to FIG. 7) that decrypts encrypted messages intended for television receiver 120. The shared key may be addressed to television receiver 120 and broadcast via the television service provider network such that other television receivers ignore the message that television receiver 120 receives, decrypts, and obtains the shared private key.

In some embodiments, rather than VR device 110 communicating directly with television receiver 120, network 130 may be used to relay information between the two devices or a registration process through OTT host 140 may be performed.

Figure 2:
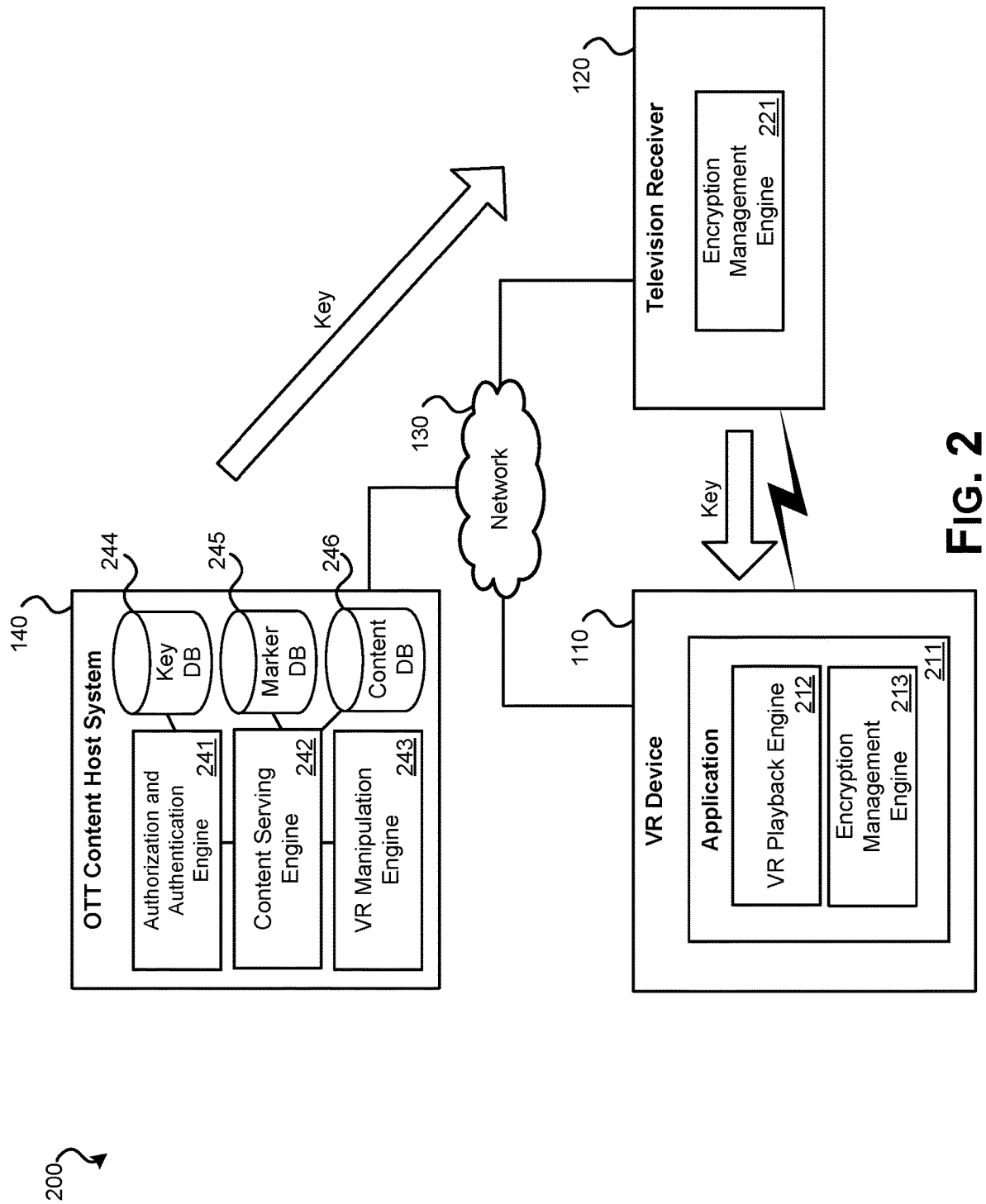
FIG. 2 illustrates another embodiment of an integrated VR content playback system.

FIG. 2 illustrates an embodiment of an integrated VR content playback system 200. Integrated VR content playback system 200 can represent a more detailed embodiment of integrated VR content playback system 100 of FIG. 1. In system 200, television receiver 120 includes and encryption management engine 221. Encryption management engine 221 may be responsible for obtaining or generating and encryption key for use by television receiver 120 and/or VR device 110. The encryption key may be a shared symmetrical key or may be a public asymmetrical key. A shared symmetrical key may be used to encrypt and decrypt data while a public asymmetrical key may only encrypt data, a separate private asymmetrical key may be used for decrypting such data that has been encrypted using the public asymmetrical key. Embodiments of system 200 may be configured to use shared symmetrical keys or public/private asymmetrical keys.

The shared symmetrical key may be transmitted by OTT host 140 to television receiver 120 via network 130. In other embodiments, the shared symmetrical key may be transmitted by OTT host 140 to television receiver 120 via a separate content distribution network operated by the television service provider that operates OTT host 140. For example, such a content distribution network is described in relation to FIG. 6. Transmission of the symmetrical key via the separate content distribution network may be preferable to limit the ability of a third-party to capture the symmetrical key and use it to encrypt or decrypt data for communication with OTT host 140. The shared symmetrical key may be generated by authorization and authentication engine 241 of OTT host 140. A copy of the shared symmetrical key may be stored in key database 244 along with an indication of the user account with which the shared symmetrical key is mapped. If, instead a public/private key pair is used, authorization and authentication engine 241 may generate the public/private key pair and store such keys to key database 244. Only the public key may be transmitted to television receiver 120. Since the public key can only be used for encryption, less security may accompany transmission of the public key. The public key may be transmitted from OTT host 142 television receiver 120 via network 130 or via the separate content distribution network, such as described in relation to FIG. 6.

VR device 110 may communicate directly with television receiver 120 to receive the shared key or the public key. Application 211 may be installed on and executed by VR device 110. Application 211 may include encryption management engine 213 and VR playback engine 212. Encryption management engine 213 may receive credentials from a user, such as in the form of a user account and password. These credentials may be transmitted by VR device 110 to television receiver 120. Encryption management engine 221 may verify the credentials by forwarding the credentials to OTT host 140 or by verifying the credentials locally. If the credentials are verified, the shared key or public key may be transmitted from OTT host 140 to television receiver 120 which then forwards the key onto VR device 110. In other embodiments, if the credentials are verified, the locally-stored shared key or locally-stored public key may be transmitted from television receiver 120 to VR device 110. In either embodiment, the key is transmitted through television receiver 120 to VR device 110.

In other embodiments, once the credentials of VR device 110 have been verified, a public key or shared key may be transmitted by OTT host 140 to VR device 110 via network 130. For example, in response to credentials being provided to television receiver 120 either directly or via VR device 110, when such credentials are authenticated, encryption management engine 221 may cause television receiver 120 to output for display a code that can be used by VR device 110 to obtain a key from OTT host 140. In some embodiments, the code may be an alphanumeric code that the user can enter into application 211. This code may then be transmitted by VR device 110 to OTT host 140 in order to retrieve the symmetrical key or public key. Alternatively, the code may be a graphical code that VR device 110 can capture (e.g., using an on-board camera). Data obtained from the graphical code may be used to access OTT host 140 to obtain the shared key or the public key.

If a public key is used, encryption management engine 213 may use the public key to encrypt a request to OTT host 140, which may include credentials, requesting the right to playback content. If authorized, authorization and authentication engine 241 may trigger application 211 to create a public/private key pair of its own and provide this public key to OTT host 140 for use in encrypting content. If a shared key is used, the shared key may be used by OTT host 144 encrypting content and the shared key may be used by encryption management engine 213 for decrypting the content. VR playback engine 212 may be used for outputting content received from OTT host 140 for viewing. In some embodiments, television receiver 120 may be able to stream content for viewing to VR device 110. A similar shared key or public/private key pair may be used for transmitting content from television receiver 120 to VR device 110.

Content serving engine 242 may be responsible for transmitting content from content database 246 of OTT host 140 to a device requesting such streaming content. Content served by content serving engine 242 may be encrypted using authorization and authentication engine 241 based on a key obtained from key database 244 links with the user account through which the content has been requested. Content serving engine 242 may access marker database 245 to determine a location within a particular piece of content at which streaming should begin. When content is played back using VR device 110 or television receiver 120, such devices may periodically transmit marker data to OTT host 140. The marker data may indicate the associated user account, the piece of content being played back, and a location within the piece of content at which playback is currently occurring. In other embodiments, rather than such marker data being transmitted periodically, such data may only be transmitted if playback of the content is stopped or paused. Television receiver 120 may have some content stored locally, such as content that was recorded off the broadcast by television receiver 120. Even though such content is being played back from a locally recorded storage medium, television receiver 120 may transmit marker data indicative of the content to OTT host 140. This marker data may include some form of universal program identifier that may be used by OTT host 140 to identify the piece of content that was recorded by television receiver 120. For example, this program identifier may be included as part of the EPG data received in stored by television receiver 120.

VR manipulation engine 243 may only be used when content is being streamed to a VR device, such as VR device 110. VR manipulation engine 243 may alter the content served by content serving engine 242 to be in a format appropriate for VR device 110. For instance, the resolution and/or bit rate may be adjusted. VR manipulation engine 243 may add supplemental content to the content being streamed.

It should be understood that the various engines of system 200 can represent software or instructions being executed by one or more general purpose processors of the respective device. For example, content serving engine 242 and authorization and authentication engine 241 may represent sets of instructions that are executed by OTT host 140 using one or more processors. Alternatively, such engines may represent functionality performed by special-purpose processors that are programmed to specifically perform the detailed functions.

Figure 3:
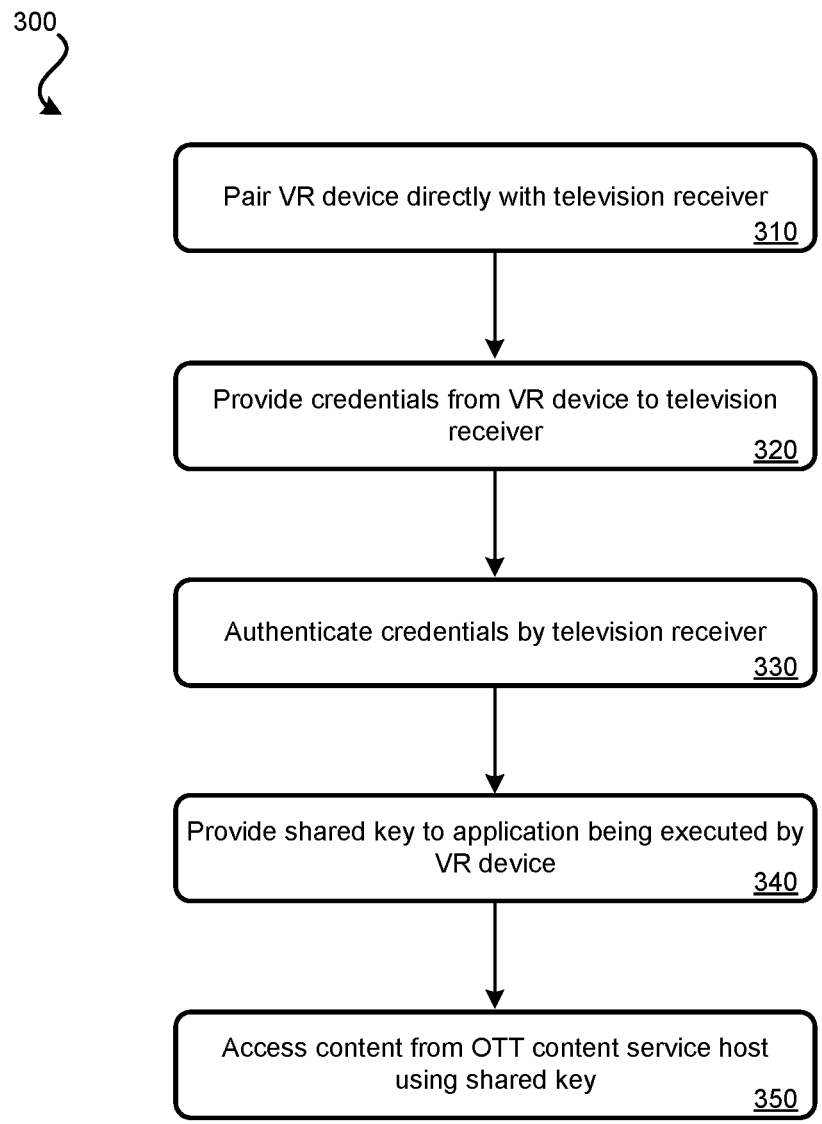
FIG. 3 illustrates an embodiment of a method for authenticating a VR headset via a television receiver.

The systems of FIGS. 1 and 2 may be used to perform various methods. FIG. 3 illustrates an embodiment of a method for authenticating a VR headset via a television receiver. Method 300 represents a registration process to ensure that a VR device is authorized to output content in association with a user account. Method 300 may be performed using system 100 or system 200. At block 310, a VR device may be paired directly with a television receiver. In some embodiments, the communication between the VR device and the television receiver is performed via a direct wireless communication protocol such as Bluetooth® or Wi-Fi Direct®. This pairing process may be followed by credentials that have been provided by a user to an application executed by the VR device being transmitted to the television receiver at block 320. These credentials may include a username, indication of a user account, and/or password. In some embodiments, additional credentials may be used, such as a fingerprint scan.

At block 330, the television receiver may authenticate the credentials. The credentials may be authenticated locally by the television receiver by comparing the received credentials with a stored copy. In other embodiments, the credentials may be transmitted by the television receiver to a remote computer system, such as an OTT host for authentication. If an OTT host is used for authentication, the request made by the television receiver may further include data indicative of the television receiver from which the authentication request is being made.

At block 340, in response to the credentials being successfully authenticated and determined to be authorized for content output via a VR device, a key may be provided by the television receiver to the VR device. This key may be a shared symmetrical key. In some embodiments, the key may have already been stored by the television receiver and may be directly transmitted to the VR device from the television receiver. In other embodiments, the shared key may be provided by the OTT host to the television receiver, which may, in turn, provide the shared key to the VR device. In other embodiments, in response to the credentials being verified to the television receiver, the OTT host may provide the shared key directly to the VR device. In still other embodiments, a public key may be provided by the television receiver to the VR device in response to successfully authenticated credentials. Or, the public key may be transmitted by the OTT host to the television receiver for routing to the VR device. Alternatively, the public key may be transmitted directly to the VR device by the OTT host in response a successful authentication of the credentials.

As part of a successful authentication, the OTT host may create an entry in a key database that indicates: a user account (or user name), an indication of the VR device, an indication of a linked television receiver, an expiration date/time of the key(s), and/or an indication of one or more keys linked with the VR device. This data may be used for future streaming of content to the VR device.

The key obtained by the VR device may be used to access streaming content from the OTT host. In some examples, in order to decrypt the content, the shared key must be stored by the VR device. Therefore, if the shared key is not stored by the VR device, decrypting the content may not be possible. If a public key has been provided to the VR device, a message encrypted using the public key may be generated by the VR device to request content and, possibly, provide a second public key to the OTT host. The OTT host may then use this second public key to encrypt the content requested which is then decrypted by the VR device using an accompanying private key.

In some embodiments, the key obtained by the VR device may periodically expire. For example, a shared key or public key obtained from the television receiver may expire after a set period of time after being acquired by the VR device, such as a day, a week, a month, or a year. An expired key may not be valid for decrypting content or making a request to the OTT host; for example, an encrypted request to the OTT host made using the key may be rejected or ignored. An application executed by the VR device may delete the key once it expires. In order to obtain a new and valid key, the registration process of block 310 through 350 may need to be re-performed. By requiring the registration process to be periodically repeated, it may be ensured that the VR device is, at least some of the time, physically local to the television receiver. This arrangement may help prevent account packing.

In some embodiments, rather than content being streaming to the VR device, content may be transferred to the VR device, stored for a time, then output for presentation. In such an arrangement, the key may be required to be valid both to receive the content and to later output the content for presentation. At the time of presentation, the key may be checked for validity through communication with the OTT content host system.

Figure 4:
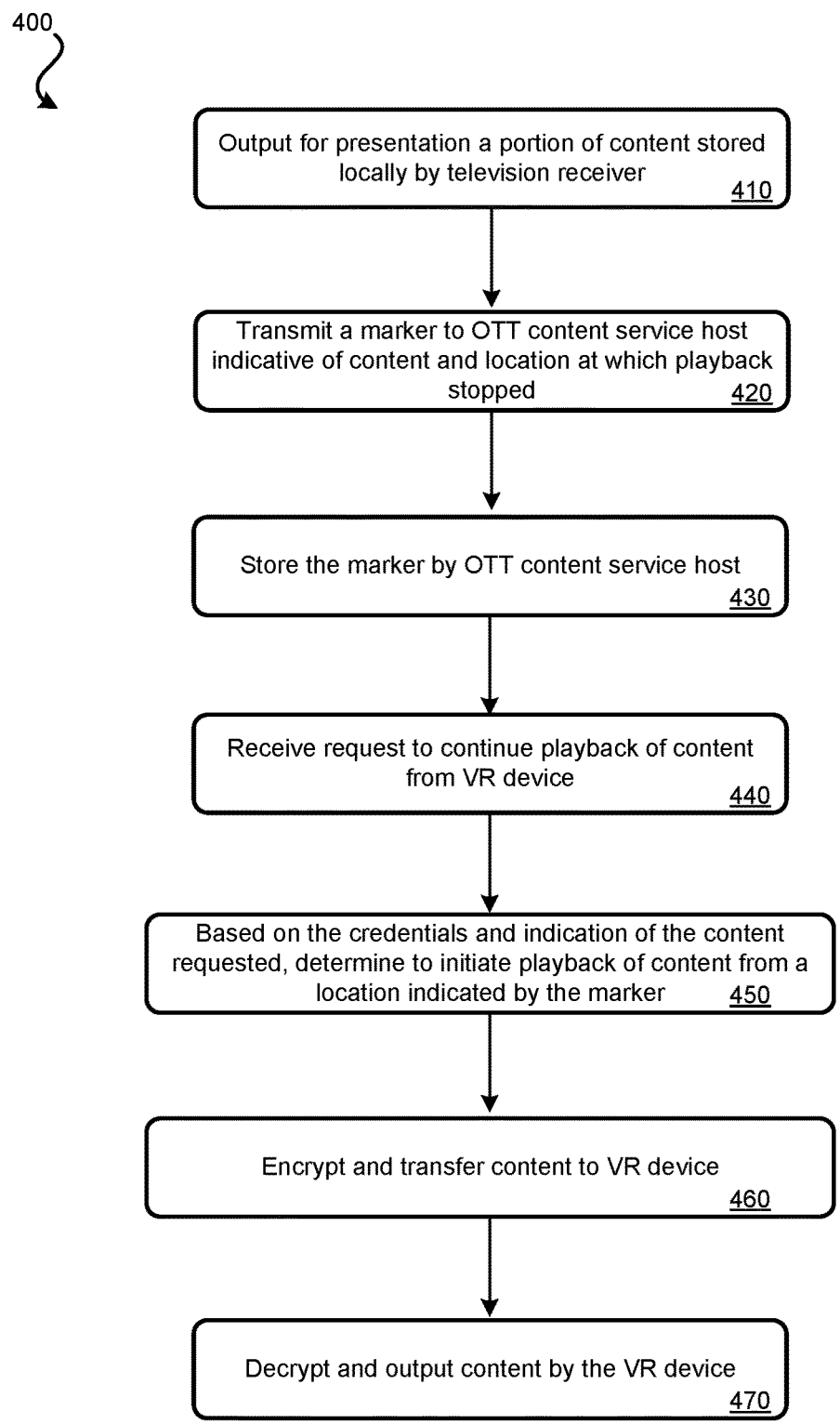
FIG. 4 illustrates an embodiment of a method for transitioning playback of locally-stored content from a television receiver to a VR headset.

FIG. 4 illustrates an embodiment of a method 400 for transitioning playback of locally-stored content from a television receiver to a VR headset. While method 300 may be used to register a VR device through a television receiver, method 400 may be used to ensure playback of content resumes from at or near a same location at which playback ceased at another device, such as a television receiver. Method 400 is focused on switching playback from a television receiver to a VR device. It should be understood that similar principles may be used for transitioning playback from the VR device to the television receiver. Method 400 may be performed at some time after the registration of method 300 is performed.

At block 410, a television receiver may output for presentation a portion of content hat is stored locally by the television receiver. This content may have been recorded from a broadcast or may be on-demand content that is transferred to the television receiver by the television service provider and stored locally. At block 410, a user may stop or pause playback by providing a command to the television receiver. At block 420, a marker may be transmitted to the OTT host in response to playback being paused or stopped. The marker may include data indicative of: the content being played back, a location within the content at which playback stopped, an indication of the user account or username associated with the playback at the television receiver, and/or the television receiver (e.g., a serial number or address). In some embodiments, rather than transmitting the marker in response to play backstopping are being paused, the marker may be transmitted periodically during playback such that the OTT host has a marker stored for the television receiver that is approximately up-to-date to where playback within content is currently occurring. In some embodiments, a checksum of the marker may be transmitted in association with the marker to help ensure that the marker is correctly received by the OTT host.

The OTT host may store this marker at block 430 in a marker database linked with the user name or the user account. A previously stored marker for the same piece of content and user account may be deleted one or more up-to-date marker has been received by the OTT host.

At block 440, the OTT host may receive a request to continue playback of the piece of content for which playback was stopped or paused at block 410. This request may include in indication of the piece of content and credentials indicative of the user name, user account, and/or password. The request may also be encrypted using the shared key or public key obtained using method 300. The OTT host, based on the received credentials and indication of the content, may first determine if it has a copy of the corresponding piece of content stored. A program identified included in the request may be used to determine if a corresponding piece of content is stored in the OTT host's content database. The program identifier may be an identifier that is included in EPG data distributed by the television service provider to television receivers that is used to uniquely identify each television program broadcast by the television service provider. Rather than using a program identifier, the request may indicate a television channel, date, and time period of the content.

Further, the OTT host, based on the received credentials and indication of the content, may access the marker database to determine if an associated marker is stored. Based on a marker stored by the database that corresponds the piece of content in the user name or user account, the OTT host may determine to initiate playback of the content from a location indicated within the stored marker. This location may at least approximately correspond to the location at which playback was stopped or paused at block 410. Beginning at the location, the content may be streamed from the OTT host to the VR device. At block 460, the content may be encrypted using a key stored by the OTT host in association with the user account, username, and/or VR device as part of the registration process of FIG. 3. The encrypted content may then be streamed to the VR device, such as via the Internet. At block 470, the content may decrypted then output by the VR device. The VR device, at block 470, may decrypt the content using a key obtained using the registration process of FIG. 3. The key may be the same key used to encrypt the content at block 460 if a shared symmetrical key arrangement is used. The key used at block 470 may be a private key, if a private/public asymmetrical key arrangement is used.

Figure 5:
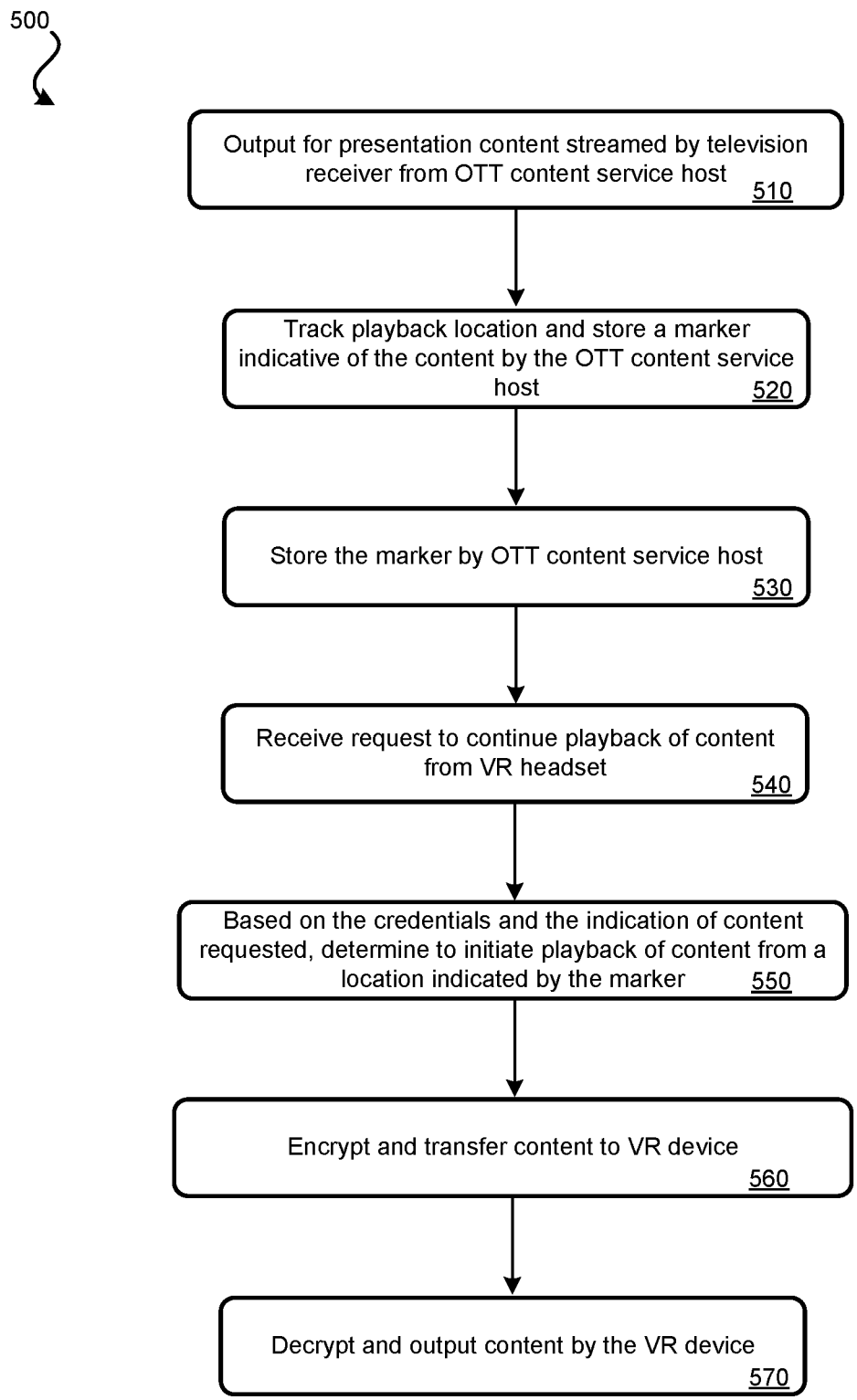
FIG. 5 illustrates an embodiment of a method for transitioning playback of streamed content from a television receiver to a VR headset.

FIG. 5 illustrates an embodiment of a method for transitioning playback of streamed content from a television receiver to a VR headset. Method 500 may be used to ensure playback of content resumes from at or near a same location at which playback ceased at another device, such as a television receiver. Method 500 is focused on switching playback from a television receiver to a VR device. It should be understood that similar principles may be used for transitioning playback from the VR device to the television receiver. Method 500 may be performed at some time after the registration of method 300 is performed. While method 400 is focused on playback of content that is stored at the television receiver; method 500 is focused on content streamed to the television receiver and VR device.

At block 510, a television receiver may output for presentation a portion of content that that is being streamed from the OTT host. At block 510, a user may stop or pause playback by providing a command to the television receiver. At block 520, a marker may be created by the OTT host and may be indicative of the content being streamed, a user name, a user account, and the location at which playback was stopped or paused. In some embodiments, rather than creating the marker in response to play backstopping are being paused, the marker may be periodically updated by the OTT host during streaming such that the OTT host has a marker stored for the television receiver that is approximately up-to-date to where playback within the content is currently occurring. The marker may be stored to a marker database at block 530.

Blocks 540-570 may be performed similarly to blocks 440-470, respectively or method 400.

Figure 6:
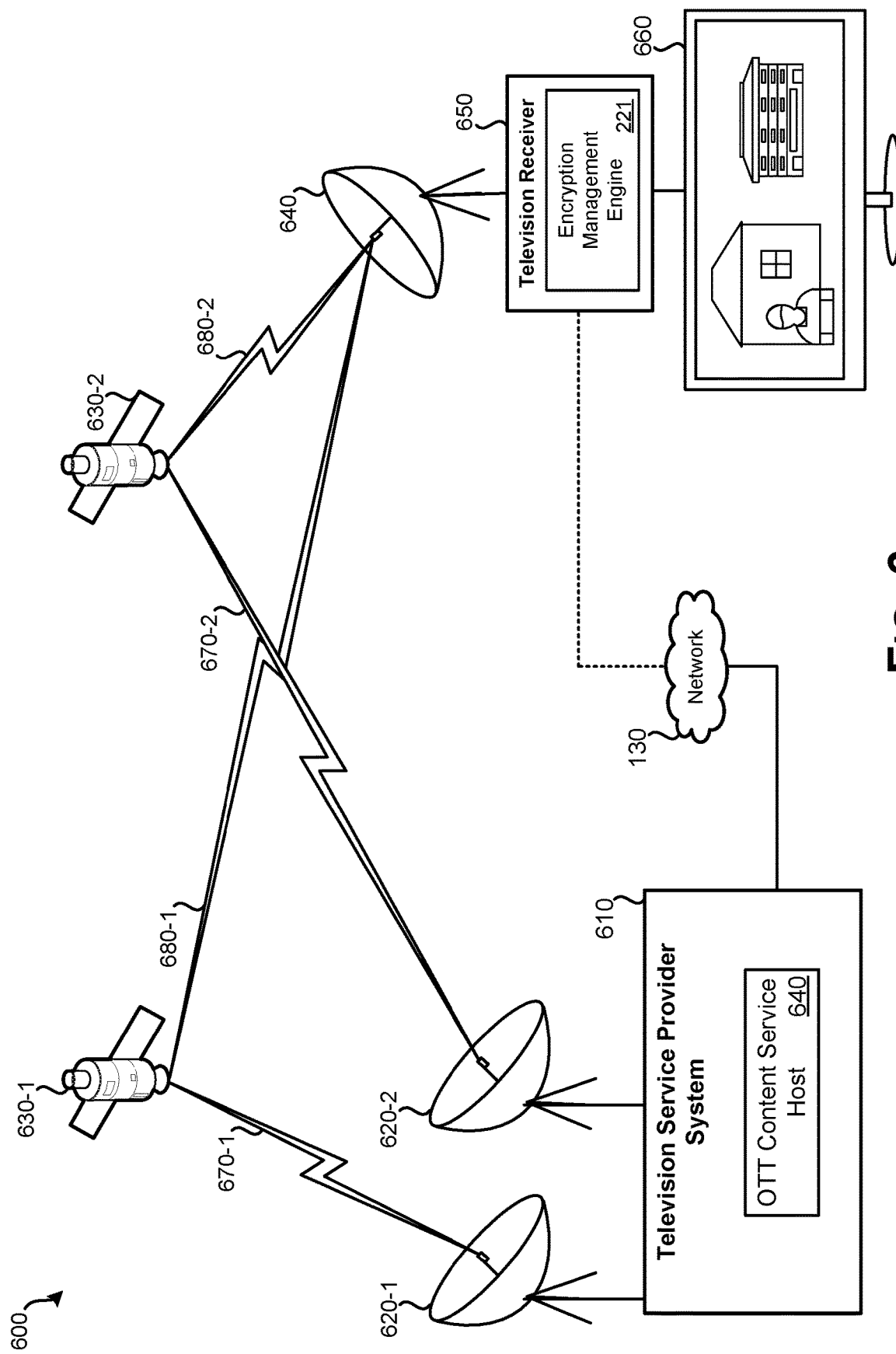
FIG. 6 illustrates an embodiment of a satellite-based television distribution system.

FIG. 6 illustrates an embodiment of a satellite-based television distributions system 600. Such an arrangement may be used for distributing a key, such as a shared symmetrical key, to a television receiver. Satellite-based television distribution system 600 may include: television service provider system 610, satellite transmitter equipment 620, satellites 630, satellite antenna 640, television receiver 650 (which can represent an embodiment of television receiver 120), and display device 660. Alternate embodiments of satellite-based television distribution system 600 may include fewer or greater numbers of components. While only one satellite antenna 640, television receiver 650, and display device 660 (which can collectively be referred to as "user equipment") are illustrated, it should be understood that multiple (e.g., tens, thousands, millions) instances of user equipment may receive television signals from television service provider system 610 via satellites 630.

Television service provider system 610 and satellite transmitter equipment 620 may be operated by a television service provider. A television service provider may distribute television channels, on-demand programming, programming information, and/or other content/services to users. Television service provider system 610 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 620 (120-1, 620-2) may be used to transmit a feed of one or more television channels from television service provider system 610 to one or more satellites 630. While a single television service provider system 610 and satellite transmitter equipment 620 are illustrated as part of satellite-based television distribution system 600, it should be understood that multiple instances of transmitter equipment may be used, possibly scattered geographically, to communicate with satellites 630. Such multiple instances of satellite transmitting equipment may communicate with the same or with different satellites. Different television channels may be transmitted to satellites 630 from different instances of transmitting equipment. For instance, a different satellite antenna of satellite transmitter equipment 620 may be used for communication with satellites in different orbital slots.

Satellites 630 may be configured to receive signals, such as streams of television channels, from one or more satellite uplinks such as satellite transmitter equipment 620. Satellites 630 may relay received signals from satellite transmitter equipment 620 (and/or other satellite transmitter equipment) to multiple instances of user equipment via transponder streams. Different frequencies may be used for uplink signals 670 from transponder streams 680. Satellites 630 may be in geosynchronous orbit. Each of the transponder streams transmitted by satellites 630 may contain multiple television channels transmitted as packetized data. For example, a single transponder stream may be a serial digital packet stream containing multiple television channels. Therefore, packets for multiple television channels may be interspersed.

Multiple satellites 630 may be used to relay television channels from television service provider system 610 to satellite antenna 640. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 630-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can he included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions. For an MCVE event, each of the television channels that are part of the event may be transmitted as part of the same transponder stream or may be spread among multiple transponder streams.

Satellite antenna 640 may be a piece of user equipment that is used to receive transponder streams from one or more satellites, such as satellites 630. Satellite antenna 640 may be provided to a subscriber for use on a subscription basis to receive television channels provided by the television service provider system 610, satellite transmitter equipment 620, and/or satellites 630. Satellite antenna 640, which may include one or more low noise blocks (LNBs), may be configured to receive transponder streams from multiple satellites and/or multiple transponders of the same satellite. Satellite antenna 640 may be configured to receive television channels via transponder streams on multiple frequencies along with other transmitted data (e.g., encryption keys). Based on the characteristics of television receiver 650 and/or satellite antenna 640, it may only be possible to capture transponder streams from a limited number of transponders concurrently. For example, a tuner of television receiver 650 may only be able to tune to a single transponder stream from a transponder of a single satellite at a given time. The tuner can then be re-tuned to another transponder of the same or a different satellite. A television receiver 650 having multiple tuners may allow for multiple transponder streams to be received at the same time.

In communication with satellite antenna 640 may be one or more television receivers. Television receivers may be configured to decode signals received from satellites 630 via satellite antenna 640 for output and presentation via a display device, such as display device 660. A television receiver may be incorporated as part of a television or may be part of a separate device, commonly referred to as a set-top box (STB). Television receiver 650 may decode signals received via satellite antenna 640 and provide an output to display device 660. FIG. 2 provides additional detail of various embodiments of a television receiver. A television receiver is defined to include STBs and also circuitry having similar functionality that may be incorporated with another device. For instance, circuitry similar to that of a television receiver may be incorporated as part of a television. As such, while FIG. 6 illustrates an embodiment of television receiver 650 as separate from display device 660, it should be understood that, in other embodiments, similar functions may be performed by a television receiver integrated with display device 660.

Display device 660 may be used to present video and/or audio decoded and output by television receiver 650. Television receiver 650 may also output a display of one or more interfaces to display device 660, such as an electronic programming guide (EPG). In many embodiments, display device 660 is a television. Display device 660 may also be a monitor, computer, or some other device configured to display video and, possibly, play audio.

Uplink signal 670-1 represents a signal between satellite transmitter equipment 620 and satellite 630-1. Uplink signal 670-2 represents a signal between satellite transmitter equipment 620 and satellite 630-2. Each of uplink signals 670 may contain streams of one or more different television channels. For example, uplink signal 670-1 may contain a first group of television channels, while uplink signal 670-2 contains a second group of television channels. Each of these television channels may be scrambled such that unauthorized persons are prevented from accessing the television channels.

Transponder stream 680-1 represents a transponder stream signal between satellite 630-1 and satellite antenna 640. Transponder stream 680-2 represents a transponder stream signal between satellite 630-2 and satellite antenna 640. Each of transponder streams 680 may contain one or more different television channels, which may be at least partially scrambled. For example, transponder stream 680-1 may be a first transponder stream containing a first group of television channels, while transponder stream 680-2 may be a second transponder stream containing a different group of television channels. When a television channel is received as part of a transponder stream and is decoded and output to display device 660 (rather than first storing the television channel to a storage medium as part of DVR functionality then later outputting the television channel from the storage medium), the television channel may be considered to be viewed "live."

FIG. 6 illustrates transponder stream 680-1 and transponder stream 680-2 being received by satellite antenna 640 and distributed to television receiver 650. For a first group of television channels, satellite antenna 640 may receive transponder stream 680-1 and for a second group of channels, transponder stream 680-2 may be received. Television receiver 650 may decode the received transponder streams. As such, depending on which television channels are desired to be presented or stored, various transponder streams from various satellites may be received, descrambled, and decoded by television receiver 650.

Network 130 may serve as a secondary communication channel between television service provider system 610 and television receiver 650. However, in many instances, television receiver 650 may be disconnected from network 130 (for reasons such as because television receiver 650 is not configured to connect to network 130 or a subscriber does not desire or cannot connect to network 130). As such, the connection between network 130 and television receiver 650 is represented by a dotted line. Via such a secondary communication channel, bidirectional exchange of data may occur. As such, data may be transmitted to television service provider system 610 from television receiver 650 via network 130. Data may also be transmitted from television service provider system 610 to television receiver 650 via network 130.

Figure 7:
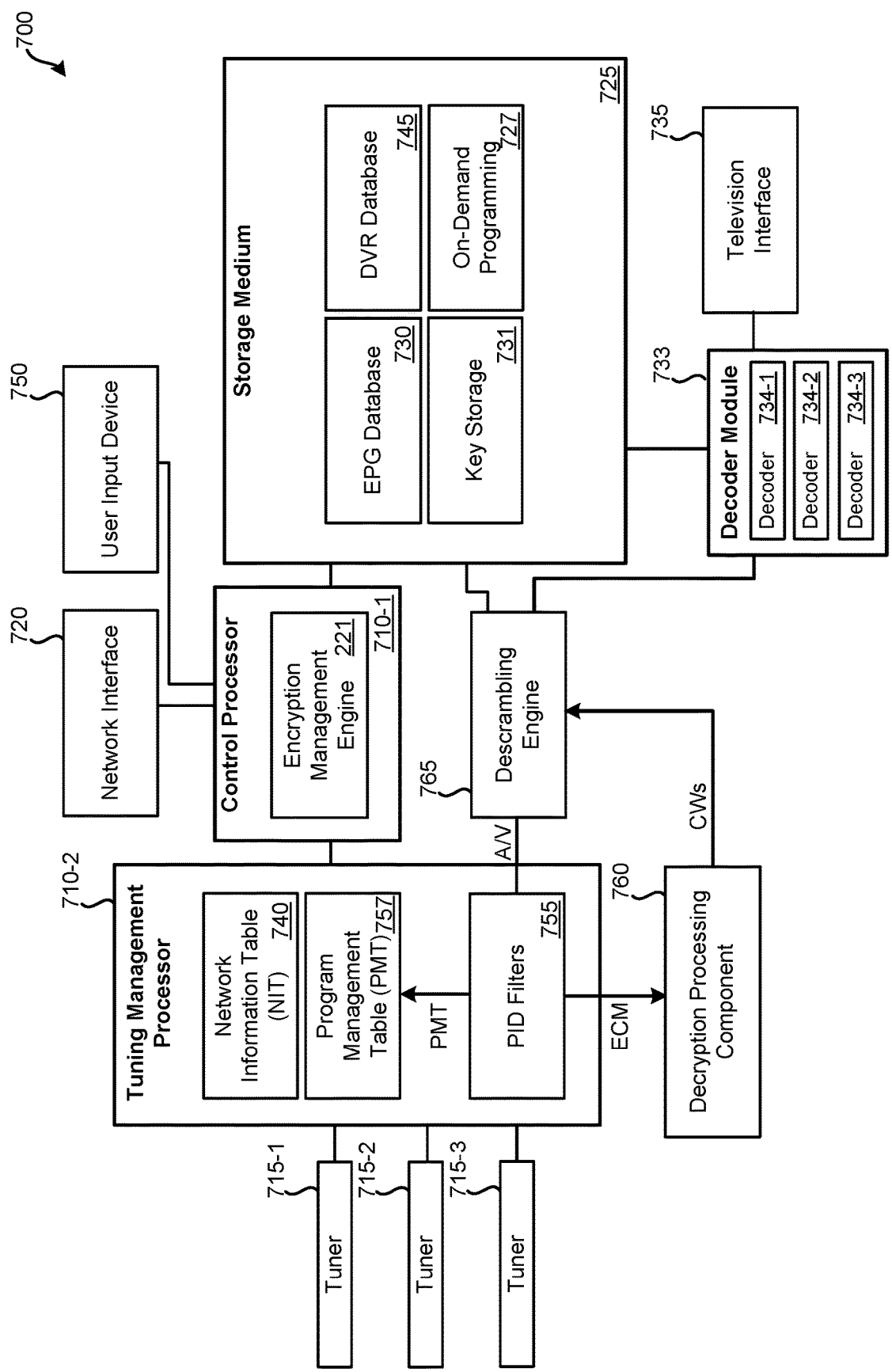
FIG. 7 illustrates an embodiment of television receiver.

FIG. 7 illustrates an embodiment of television receiver 700. It should be understood that television receiver 700 can represent a more detailed embodiment of television receiver 120. Television receiver 700 may be configured to provide. Television receiver 700 may be in the form of a separate device configured to be connected with a display device, such as a television. Embodiments of television receiver 700 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 700 may represent television receiver 150 of FIG. 1 and may be in the form of an STB that outputs video and/or audio to a display device, such as a television. Television receiver 700 may be incorporated as part of a television, such as display device 160 of FIG. 1. Television receiver 700 may include: processors 710 (which may include control processor 710-1, tuning management processor 710-2, and possibly additional processors), tuners 715, network interface 720, non-transitory computer-readable storage medium 725, electronic programming guide (EPG) database 730, television interface 735, networking information table (NIT) 740, digital video recorder (DVR) database 745 (which may include provider-managed television programming storage and/or user-defined television programming), on-demand programming 727, key storage 731, user input device 750, decryption processing component 760 (which can be in the form of a removable or non-removable smartcard), and/or descrambling engine 765. In other embodiments of television receiver 700, fewer or greater numbers of components may be present. It should be understood that the various components of television receiver 700 may be implemented using hardware, firmware, software, and/or some combination thereof. Functionality of components may be combined; for example, functions of descrambling engine 765 may be performed by tuning management processor 710-2. Further, functionality of components may be spread among additional components; for example, PID (packet identifier) filters 755 may be handled by separate hardware from program management table (PMT_757.

Processors 710 may include one or more specialized and/or general-purpose processors configured to perform processes such as tuning to a particular channel, accessing and displaying EPG information from EPG database 730, and/or receiving and processing input from a user. For example, processors 710 may include one or more processors dedicated to decoding video signals from a particular format, such as MPEG, for output and display on a television and for performing decryption. It should be understood that the functions performed by various modules of FIG. 7 may be performed using one or more processors. As such, for example, functions of descrambling engine 765 may be performed by control processor 710-1.

Control processor 710-1 may communicate with tuning management processor 710-2. Control processor 710-1 may control the recording of television channels based on timers stored in DVR database 745. Control processor 710-1 may also provide commands to tuning management processor 710-2 when recording of a television channel is to cease. In addition to providing commands relating to the recording of television channels, control processor 710-1 may provide commands to tuning management processor 710-2 that indicate television channels to be output to decoder module 733 for output to a display device. Control processor 710-1 may also communicate with network interface 720 and user input device 750. Control processor 710-1 may handle incoming data from network interface 720 and user input device 750. Additionally, control processor 710-1 may be configured to output data via network interface 720. Control processor 710-1 may include a MOTE processing engine 711. The functionality of encryption management engine 221 may be provided by control processor 710-1.

Tuners 715 may include one or more tuners used to tune to transponders that include broadcasts of one or more television channels. In the illustrated embodiment of television receiver 700, three tuners are present (tuner 715-1, tuner 715-2, and tuner 715-3). In other embodiments, two or more than three tuners may be present, such as four, six, or eight tuners. Each tuner contained in tuners 715 may be capable of receiving and processing a single transponder stream from a satellite transponder at a given time. As such, a single tuner may tune to a single transponder stream at a given time. If tuners 715 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 715 may be used to receive the signal containing the multiple television channels for presentation and/or recording. Tuners 715 may receive commands from tuning management processor 710-2. Such commands may instruct tuners 715 which frequencies or transponder streams to tune.

Network interface 720 may be used to communicate via an alternate communication channel with a television service provider, if such communication channel is available. The primary communication channel may be via satellite (which may be unidirectional to television receiver 700) and the alternate communication channel (which may be bidirectional) may be via a network, such as the Internet. Referring back to FIG. 6, television receiver 650 may be able to communicate with television service provider system 610 via a network, such as the Internet. This communication may be bidirectional: data may be transmitted from television receiver 650 to television service provider system 610 and from television service provider system 610 to television receiver 650. Referring back to FIG. 7, network interface 720 may be configured to communicate via one or more networks, such as the Internet, to communicate with television service provider system 610 of FIG. 6. Information may be transmitted and/or received via network interface 720. For instance, instructions (e.g., regarding subscription portability, MCVE definitions) from a television service provider may also be received via network interface 720, if connected with the Internet. Network interface 720 may be used to provide a confirmation to a television service provider that instructions received from the television service provider have indeed been executed.

Storage medium 725 may represent one or more non-transitory computer-readable storage mediums. Storage medium 725 may include memory and/or a hard drive. Storage medium 725 may be used to store information received from one or more satellites and/or information received via network interface 720. Storage medium 725 may store information related to EPG database 730, key storage 731, DVR database 745, and/or on-demand programming 727. Recorded television programs, which were recorded based on a provider- or user-defined timer may be stored using storage medium 725 as part of a DVR database. Storage medium 725 may be partitioned or otherwise divided (such as into folders) such that predefined amounts of storage medium 725 are devoted to storage of television programs recorded due to user-defined timers and stored television programs recorded due to provider-defined timers.

Key storage 731 may be used to store shared symmetrical or public asymmetrical keys that may be distributed by encryption management engine 221 to a VR device that is successfully authenticated.

EPG database 730 may store information related to television channels and the timing of programs appearing on such television channels. EPG database 730 may include program identifiers that individually identified television programs indicated in the EPG data. Information from EPG database 730 may be used to inform users of what television channels or programs are popular and/or provide recommendations to the user. Information from EPG database 730 may provide the user with a visual interface displayed by a television that allows a user to browse and select television channels and/or television programs for viewing and/or recording. Information used to populate EPG database 730 may be received via network interface 720 and/or via satellites, such as satellites 630 of FIG. 6 via tuners 715. For instance, updates to EPG database 730 may be received periodically via satellite. EPG database 730 may serve as an interface for a user to control DVR functions of television receiver 700, and/or to enable viewing and/or recording of multiple television channels simultaneously.

The network information table (NIT) 740 may store information used by television receiver 700 to access various television channels. NIT 740 may be stored locally by a processor, such as tuning management processor 710-2 and/or by storage medium 725. Information used to populate NIT 740 may be received via satellite (or cable) through tuners 715 and/or may be received via network interface 720 from the television service provider. As such, information present in NIT 740 may be periodically updated. In some embodiments, NIT 740 may be locally-stored by television receiver 700 using storage medium 725. Generally, NIT 740 may store information about a service provider network, such as a satellite-based service provider network. Information that may be present in NIT 740 may include: television channel numbers, satellite identifiers (which may be used to ensure different satellites are tuned to for reception of timing signals), frequency identifiers and/or transponder identifiers for various television channels. In some embodiments, NIT 740 may contain additional data or additional tables may be stored by the television receiver. For example, while specific audio PIDs and video PIDs may not be present in NIT 740, a channel identifier may be present within NIT 740 which may be used to look up the audio PIDs and video PIDs in another table, such as a program map table (PMT). In some embodiments, a ND associated with the data for the PMT is indicated in a separate table, program association table (PAT), which is not illustrated in FIG. 7. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 740 and/or PMT 757 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

Decoder module 733 may serve to convert encoded video and audio into a format suitable for output to a display device. For instance, decoder module 733 may receive MPEG video and audio from storage medium 725 or descrambling engine 765 to be output to a television. MPEG video and audio from storage medium 725 may have been recorded to DVR database 745 as part of a previously-recorded television program. Decoder module 733 may convert the MPEG video and audio into a format appropriate to be displayed by a television or other form of display device and audio into a format appropriate to be output from speakers, respectively. Decoder module 733 may have the ability to convert a finite number of television channel streams received from storage medium 725 or descrambling engine 765 simultaneously. For instance, each of decoders 734 within decoder module 733 may be able to only decode a single television channel at a time. While decoder module 733 is illustrated as having three decoders 734 (decoder 734-1, decoder 734-2, and decoder 734-3), in other embodiments, a greater or fewer number of decoders may be present in television receiver 700.

Television interface 735 may serve to output a signal to a television (or another form of display device) in a proper format for display of video and playback of audio. As such, television interface 735 may output one or more television channels, stored television programming from storage medium 725 (e.g., television programs from DVR database 745, television programs from on-demand programming storage 727 and/or information from EPG database 730) to a television for presentation. Television interface 735 may serve to output a MCVE interface to a presentation device or television. This MCVE interface may present multiple (e.g., four) television channels simultaneously, possibly all in high definition.

Digital Video Recorder (DVR) functionality may permit a television channel to be recorded for a period of time. DVR functionality of television receiver 700 may be managed by control processor 710-1. Control processor 710-1 may coordinate the television channel, start time, and stop time of when recording of a television channel is to occur. DVR database 745 may store information related to the recording of television channels. DVR database 745 may store timers that are used by control processor 710-1 to determine when a television channel should be tuned to and its programs recorded to DVR database 745 of storage medium 725. In some embodiments, a limited amount of storage medium 725 may be devoted to DVR database 745. Timers may be set by the television service provider and/or one or more users of television receiver 700.

DVR database 745 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 700 via the television provider's network. For example, referring to satellite-based television distribution system 600 of FIG. 6, in a satellite-based television service provider system, data necessary to create the provider-defined timers at television receiver 650 may be received via satellite.

As an example of DVR functionality of television receiver 700 being used to record based on provider-defined timers, a television service provider may configure television receiver 700 to record television programming on multiple, predefined television channels for a predefined period of time, on predefined dates. For instance, a television service provider may configure television receiver 700 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 725 for provider-managed television programming storage.

On-demand programming 727 may represent additional television programming stored by storage medium 725. On-demand programming 727 may include television programming that was not recorded to storage medium 725 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 727 may be the same for each television receiver of a television service provider.

User input device 750 may include a remote control (physically separate from television receiver 700) and/or one or more buttons on television receiver 700 that allow a user to interact with television receiver 700. User input device 750 may be used to select a television channel for viewing, view information from EPG database 730, and/or program a timer stored to DVR database 745, wherein the timer is used to control the DVR functionality of control processor 710-1. In some embodiments, it may be possible to load some or all of preferences to a remote control. As such, the remote control can serve as a backup storage device for the preferences.

Referring back to tuners 715, television channels received via satellite (or cable) may contain at least some scrambled data. Packets of audio and video may be scrambled to prevent unauthorized users (e.g., nonsubscribers) from receiving television programming without paying the television service provider. When a tuner of tuners 715 is receiving data from a particular transponder of a satellite, the transponder stream may be a series of data packets corresponding to multiple television channels. Each data packet may contain a packet identifier (PID), which, in combination with NIT 740 and/or PMT 757, can be determined to be associated with a particular television channel. Particular data packets, referred to as entitlement control messages (ECMs), may be periodically transmitted. ECMs may be associated with another RID and may be encrypted; television receiver 700 may use decryption engine 761 of decryption processing component 760 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 760 for decryption. A special addressed packet or series of packets may be used to transmit a key to television receiver 700 for storage and/or distribution to a VR device.

When decryption processing component 760 receives an encrypted ECM, decryption processing component 760 may decrypt the ECM to obtain some number of control words. In some embodiments, from each ECM received by decryption processing component 760, two control words are obtained. In some embodiments, when decryption processing component 760 receives an ECM, it compares the ECM to the previously received ECM. If the two ECMs match, the second ECM is not decrypted because the same control words would be obtained. In other embodiments, each ECM received by decryption processing component 760 is decrypted; however, if a second ECM matches a first ECM, the outputted control words will match; thus, effectively, the second ECM does not affect the control words output by decryption processing component 760. Decryption processing component 760 may be permanently part of television receiver 700 or may be configured to be inserted and removed from television receiver 700.

Tuning management processor 710-2 may be in communication with tuners 715 and control processor 710-1. Tuning management processor 710-2 may be configured to receive commands from control processor 710-1. Such commands may indicate when to start/stop recording a television channel and/or when to start/stop causing a television channel to be output to a television. Tuning management processor 710-2 may control tuners 715. Tuning management processor 710-2 may provide commands to tuners 715 that instruct the tuners which satellite, transponder, and/or frequency to tune to. From tuners 715, tuning management processor 710-2 may receive transponder streams of packetized data. As previously detailed, some or all of these packets may include a PID that identifies the content of the packet.

Tuning management processor 710-2 may be configured to create one or more PID filters 755 that sort packets received from tuners 715 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 740 or another table, such as a program association table (PAT). From the PMT data packets, PMT may be constructed by tuning management processor 710-2.

PID filters 755 may be configured to filter data packets based on PIDs. In some embodiments, PID filters 755 are created and executed by tuning management processor 710-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 757). For example, if a transponder data stream includes multiple television channels, data packets corresponding to a television channel that is not desired to be stored or displayed by the user may be ignored by PID filters 755. As such, only data packets corresponding to the one or more television channels desired to be stored and/or displayed may be filtered and passed to either descrambling engine 765 or decryption processing component 760; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 740, may be appropriately routed by PID filters 755. At a given time, one or multiple PID filters may be executed by tuning management processor 710-2.

Descrambling engine 765 may use the control words output by decryption processing component 760 in order to descramble video and/or audio corresponding to television channels for storage and/or presentation. Video and/or audio data contained in the transponder data stream received by tuners 715 may be scrambled. Video and/or audio data may be descrambled by descrambling engine 765 using a particular control word. Which control word output by decryption processing component 760 to be used for successful descrambling may be indicated by a scramble control identifier present within the data packet containing the scrambled video or audio. Descrambled video and/or audio may be output by descrambling engine 765 to storage medium 725 for storage (in DVS database 745) and/or to decoder module 733 for output to a television or other presentation equipment via television interface 735.

For simplicity, television receiver 700 of FIG. 7 has been reduced to a block diagram; commonly known parts, such as a power supply, have been omitted. Further, some routing between the various modules of television receiver 700 has been illustrated. Such illustrations are for exemplary purposes only. The state of two modules not being directly or indirectly connected does not indicate the modules cannot communicate. Rather, connections between modules of the television receiver 700 are intended only to indicate possible common data routing. It should be understood that the modules of television receiver 700 may be combined into a fewer number of modules or divided into a greater number of modules. Further, the components of television receiver 700 may be part of another device, such as built into a television.

It should be understood that television receiver 700, along with the other computerized systems and devices detailed herein, including VR device 110 and OTT host 140, may include various computerized components include: memories, processors, data buses, user interfaces, power supplies, etc. Such components have been omitted from the description and figures for simplicity.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for authorizing and performing content playback, the method comprising:
   providing, by a smartphone to a television receiver, via direct wireless communication, a set of authentication credentials;
   authenticating, by the television receiver, the set of authentication credentials;
   providing, by the television receiver to the smartphone, access to a shared encryption key, wherein the shared encryption key is used to decrypt content from an over-the-top (OTT) content host system;
   requesting, by the smartphone, content from the OTT content host system;
   receiving, by the smartphone, encrypted content from the OTT content host system, wherein the encrypted content corresponds to the requested content;
   decrypting, by the smartphone, the encrypted content received from the OTT content host system using the shared encryption key to create decrypted content; and
   presenting, by the smartphone, the decrypted content.

2. The method of claim 1, further comprising:
   outputting, by the television receiver, for presentation a first portion of the content prior to outputting, by the smartphone, for presentation the portion of the decrypted content, wherein the first portion of the content is output from a copy of the content stored locally by the television receiver; and
   transmitting, by the television receiver, a marker to the OTT content host system, wherein the marker is indicative of a location within the content at which playback stopped.

3. The method of claim 2, wherein the encrypted content sequentially follows the first portion of the content.

4. The method of claim 3, further comprising:
   in response to the smartphone requesting the content from the OTT content host system using the set of authentication credentials, determining, by the OTT content host system, a second portion of the content to transmit as the encrypted content based at least in part on the marker; and
   streaming, by the OTT content host system the second portion of the content as the encrypted content to the smartphone.

5. The method of claim 1, further comprising:
   outputting, by the television receiver, for presentation a first portion of the content prior to outputting, by the smartphone, for presentation the portion of the decrypted content;
   storing, by the OTT content host system, a marker indicative of a location within the content at which playback stopped, wherein the encrypted content sequentially follows the first portion of the content; and
   in response to the smartphone requesting the content from the OTT content host system using the set of authentication credentials, determining, by the OTT content host system, a first portion of the content to transmit as the encrypted content based on the marker.

6. The method of claim 1, wherein providing, by the television receiver to the smartphone, access to a shared encryption key comprises the television receiver transmitting the shared encryption key to the smartphone via direct wireless communication.

7. The method of claim 1, wherein providing, by the television receiver to the smartphone, access to a shared encryption key comprises:
   providing, by the television receiver, the smartphone with data sufficient to retrieve the shared encryption key from the OTT content host system; and
   retrieving, by the smartphone, from the OTT content host system, the shared encryption key using the data provided by the television receiver.

8. The method of claim 7, wherein:
   providing, by the television receiver, the smartphone with the data sufficient to retrieve the shared encryption key from the OTT content host system comprises the television receiver outputting for presentation a graphical code that is imaged by the smartphone.

9. The method of claim 7, wherein:
   providing, by the television receiver, the smartphone with the data sufficient to retrieve the shared encryption key from the OTT content host system comprises the television receiver outputting for presentation an alphanumeric code to be input to the smartphone.

10. The method of claim 1, further comprising:
    deleting, by the smartphone, the shared encryption key in response to an expiration time of the shared encryption key being reached.

11. A system for playing back content, the system comprising:
    a television receiver comprising one or more processors and one or more tuners, configured to:
       authenticate a set of authentication credentials;
       provide, to a smartphone, access to a shared encryption key, wherein the shared encryption key is used to decrypt content from an over-the-top (OTT) content host system; and
    the smartphone, comprising an electronic display and a wireless communication interface, wherein the smartphone is configured to:
       provide, to the television receiver, via direct wireless communication, the set of authentication credentials;
       request content from the OTT content host system using the set of authentication credentials;

receive encrypted content from the OTT content host system, wherein the encrypted content corresponds to the requested content;

decrypt the encrypted content received from the OTT content host system using the shared encryption key to create decrypted content; and output for presentation, via the electronic display, the decrypted content.

12. The system of claim 11, wherein the television receiver is further configured to output, for presentation, a first portion of the content prior to the smartphone outputting for presentation the portion of the decrypted content, wherein the first portion of the content is output from a copy of the content stored locally by the television receiver; and the television receiver is further configured to transmit a marker to the OTT content host system, wherein the marker is indicative of a location within the content at which playback stopped.

13. The system of claim 12, wherein the encrypted content sequentially follows the first portion of the content.

14. The system for playing back content at a virtual reality device of claim 13, further comprising the OTT content host system, configured to:

in response to the smartphone requesting the content from the OTT content host system using the set of authentication credentials, determine a second portion of the content to transmit as the encrypted content based on the marker; and stream the second portion of the content as the encrypted content to the smartphone.

15. The system for playing back content at a virtual reality device of claim 11, the system further comprising the OTT content host system and the television receiver further configured to:

output, for presentation, a first portion of the content prior to the smartphone outputting for presentation the portion of the decrypted content; and wherein the OTT content host system is configured to determine a first portion of the content to transmit as the encrypted content based on a stored marker indicative of a user account linked with the television receiver, the content, and a location within the content at which playback stopped, wherein the encrypted content sequentially follows the first portion of the content.

16. The system of claim 11, wherein the television receiver is configured to transmit the shared encryption key to the smartphone via direct wireless communication.

17. The system of claim 11, wherein the television receiver providing access to the shared encryption key to the smartphone comprises:

the television receiver being configured to provide the smartphone with data sufficient to retrieve the shared encryption key from the OTT content host system; and the smartphone being configured to retrieve, from the OTT content host system, the shared encryption key using the data provided by the television receiver.

18. The system of claim 17, wherein:

the television receiver providing the smartphone with the data sufficient to retrieve the shared encryption key from the OTT content host system comprises the television receiver being configured to output for presentation a graphical code for capture by the smartphone using a camera of the smartphone.

19. The system of claim 17, wherein:

the television receiver providing the smartphone with the data sufficient to retrieve the shared encryption key from the OTT content host system comprises the television receiver being configured to output for presentation an alphanumeric code to be input to the smartphone.

20. The system for playing back content at a virtual reality device of claim 11, wherein the smartphone is further configured to delete the shared encryption key in response to an expiration time of the shared encryption key being reached.

* * * * *